United States Patent [19]
Farrell et al.

[11] Patent Number: 4,816,342
[45] Date of Patent: * Mar. 28, 1989

[54] POLYMERIC STRUCTURE HAVING IMPROVED BARRIER PROPERTIES AND METHOD OF MAKING SAME

[75] Inventors: Christopher J. Farrell, Arlington Heights; Boh Tsai, Rolling Meadows; James A. Wachtel, Buffalo Grove, all of Ill.

[73] Assignee: American National Can Company, Chicago, Ill.

[*] Notice: The portion of the term of this patent subsequent to Jan. 10, 2001 has been disclaimed.

[21] Appl. No.: 916,272

[22] Filed: Dec. 11, 1986

Related U.S. Application Data

[63] Continuation of Ser. No. 538,106, Oct. 3, 1983, Continuation-in-part of Ser. No. 418,199, Sep. 15, 1982, Pat. No. 4,425,410, Continuation-in-part of Ser. No. 101,703, Dec. 10, 1979, Pat. No. 4,407,897.

[51] Int. Cl.$^4$ .............................................. B32B 27/00
[52] U.S. Cl. .................................. 428/475.5; 428/500; 428/522; 428/913; 528/499
[58] Field of Search .................... 528/499; 428/474.4, 428/522, 523, 516, 518, 475.5, 500

[56] References Cited

U.S. PATENT DOCUMENTS

4,082,854  4/1978  Yamada et al. ...................... 428/425
4,407,897  10/1983  Farrell et al. ........................ 428/526

OTHER PUBLICATIONS

Encyclopedia of Polymer Science and Technology Supplement, vol., pp. 65–67 (1976), vol. 4, p. 462.
Polyvinyl Alcohol, pp. 340–341, 375, 495–499.
Chemical Abstracts, vol. 58, 5 12688 (1963).
Journal of Polymer Science, vol. XLI, pp. 53–71.

*Primary Examiner*—Edith Buffalow
*Attorney, Agent, or Firm*—Paul R. Audet

[57] ABSTRACT

A polymeric structure having an oxygen barrier layer (e.g., ethylene-vinyl alcohol copolymer) is heated in the presence of moisture to improve its resistance to oxygen and moisture penetration. A drying agent is incorporated in the multi-layer structure to control the rate of water penetration to, and the amount of water in, the barrier layer.

25 Claims, 6 Drawing Sheets

POLYMERIC STRUCTURE HAVING IMPROVED BARRIER PROPERTIES AND METHOD OF MAKING SAME

RELATED APPLICATIONS

This is a continuation of application Ser. No. 538,106, filed Oct. 3, 1983, which is a continuation-in-part of application Ser. No. 418,199, filed Sept. 15, 1982, U.S. Pat. No. 4,425,410, which is in turn a continuation-in-part of application Ser. No. 101,703, filed Dec. 10, 1979 U.S. Pat. No. 4,407,899.

FIELD OF INVENTION

Polymeric films and multi-layer polymeric structures are increasingly used as packaging materials for foodstuffs, medicinal products and a host of other items. Flexible polymer films and multi-layer polymeric structures are widely used for making pouches, wrappers, bags, thermoformed containers and injection blow molded containers for packaging various foods. Such packaged foods are usually thermally sterilized for safety and health purposes.

In packaging many products, oxygen permeability is of paramount consideration and, therefore, the multilayer structures or films used for packaging of such products must be sufficiently impermeable to oxygen to prevent degradation of the packaged products, particularly during their storage.

Ethylene-vinyl alcohol copolymers are thermoplastic and melt-extrudable polymers with known oxygen impermeability and resistance to oil. However, these copolymers are permeable to moisture, and their oxygen permeability increases as their moisture content is increased. Therefore, in order to protect the ethylene-vinyl alcohol copolymer layer from moisture, it is usually buried between outer and inner layers of moisture barrier layers such as polyethylene, Polypropylene or blends thereof.

Ethylene-vinyl alcohol copolymers are considerably more expensive than other polymers which are commonly used as packaging materials. However, in making a multi-layer laminate suitable as packaging material, a very thin layer of ethylene-vinyl alcohol in the laminate structure affords the necessary resistance to oxygen permeation, with the outer and inner polyolefin layers providing the requisite structural integrity and moisture resistance. Typically, tese polyolefin layers are bonded to the intermediate ethylene-vinyl alcohol copolymer layer by a suitable adhesive layer.

In order to prevent moisture penetration in the ethylene-vinyl alcohol copolymer layer in a multi-layer polymeric structure, drying agents (desiccants) may be incorporated in the laminate structure, usually in the layer proximate to the ethylene-vinyl alcohol copolymer layer. A variety of such desiccants are disclosed and their effects described in said application Ser. No. 418,199, filed Sept. 15, 1982 now U.S. Pat. No. 425,541, the disclosure of which is fully incorporated herein by reference.

Efforts have been made in the past to improve oxygen resistance of ethylene-vinyl alcohol copolymers. For example, U.S. Pat. No. 4,294,935 which issued to Yuji Kodera et al. on Oct. 13, 1981 suggests that by increasing the orientation of ethylene-vinyl alcohol copolymer films, as well as increasing their degree of crystallinity, the gas barrier properties of these films will be less adversely affected by moisture. The method described in this patent involves biaxially or multiaxially orienting the ethylene-vinyl alcohol copolymer films and, if necessary, heating the stretched film at a temperature between 100° C. and a temperature which is lower than the melting point of the copolymer by 10° C. Heat treatment of the film is said to promote hydrogen bonding and increases the degree of crystallinity. U.S. Pat. No. 4,082,854 which issued to Yamada et al. on Apr. 4, 1978 discloses that the resistance to oxygen permeation of ethylene-vinyl alcohol copolymer is improved by heat treatment under specified time and temperature conditions which cause a subsidiary endothermic peak to appear in the so-called differential thermal analysis (DTA) curve of the copolymer. The heat treatment of the film in this patent, however, is under dry conditions. This type of heat treatment is sometimes referred to as "dry annealing".

Other patents of interest and by way of general background in this area include U.S. Pat. Nos. 3,061,884; 3,957,941; 3,124,415; 3,560,325; 3,907,675; 3,957,941; 3,985,849; 4,230,654 and 4,303,711.

While dry annealing of ethylene-vinyl alcohol copolymer by the method described in the aforementioned Yamada et al. patent results in some improvement in its resistance to oxygen permeation, this improvement is modest in most instances. Where more oxygen impermeability is required, dry annealing has not provided a satisfactory solution.

It is, accordingly, an object of this invention to improve the resistance of ethylene-vinyl alcohol copolymers and polyvinyl alcohol to oxygen permeation.

It is a further object of this invention to provide a method of improving the oxygen resistance of polyvinyl alcohol and ethylene-vinyl alcohol copolymers.

It is also an object of this invention to provide films of polyvinyl alcohol and ethylene-vinyl alcohol copolymers and multi-layer polymeric structures comprising a layer of polyvinyl alcohol and ethylene-vinyl copolymer, wherein the resistance of oxygen permeation of the film or the multilayer polymeric structure is sufficiently improved to meet the stringent demands of the food packaging industry whenever high resistance to oxygen permeation is required.

The foregoing and other objects of the present invention will become more apparent from the following detailed description and the drawings which illustrate the principles and advantages of this invention.

SUMMARY OF THE INVENTION

A film of polyvinyl alcohol or ethylene-vinyl alcohol copolymer, or a polymeric structure (e.g., laminate comprising a film of polyvinyl alcohol or ethylene-vinyl alcohol copolymer, is heated in the presence of moisture (e.g., in a humid environment) to improve the resistance of the film or the polymeric structure to oxygen permeation. This method, which is sometimes referred to herein as "wet annealing" is more effective than "dry annealing" in increasing the oxygen resistance of such films or polymeric structures.

Improved resistance to oxygen permeability is realized by maintaining low initial water content in the polyvinyl alcohol or the ethylene-vinyl alcohol copolymer film. In order to prevent moisture permeation into the film, and hence maintaining low water level therein during the wet annealing process, a drying agent (desciccant) can be incorporated in the film, or, in the case of a multi-layer structure, in the layer proximate to the oxygen-resistant layer.

DETAILED DESCRIPTION OF THE INVENTION

Oxygen barrier properties of polyvinyl alcohol films, ethylene-vinyl alcohol copolymer films and polymeric structure comprising such films, is improved by wet annealing, i.e., heating the polymeric structure in the presence of moisture, e.g., in a humid environment, the wet annealing is generally carried out at elevated temperatures, usually from about 210° F. to about 250° F., in an atmosphere of from about 20 to about 100 percent relative humidity. Wet annealing has been found to significantly increase the resistance of such films and polymeric structures to oxygen permeation as compared to dry annealing. Improvement is also realized in the moisture resistance of these films and polymeric structures comprising such films.

When ethylene-vinyl alcohol copolymer is dry annealed, as by the method described in the aforementioned Yamada et al. patent, in addition to the main endothermic peak, a second or "subsidiary" endothermic peak appears in the copolymer corresponding to a melting point of 103° C. (37°K.). The appearance of such subsidiary melting point is associated with the appearance of a secondary crystalline structure and is said to signify improvement in oxygen barrier properties of the copolymer. Yamada et al. further disclose that this subsidiary endothermic peak is due to the melting of the polyethylene or the polymer chain of ethylene-rich segments present in the ethylene-vinyl alcohol copolymer. The gas permeation is improved as a result of crystallization of the polyethylene portion of the ethylene-resin segments present in the copolymer. (See column 4, lines 46–62).

Figure 1:
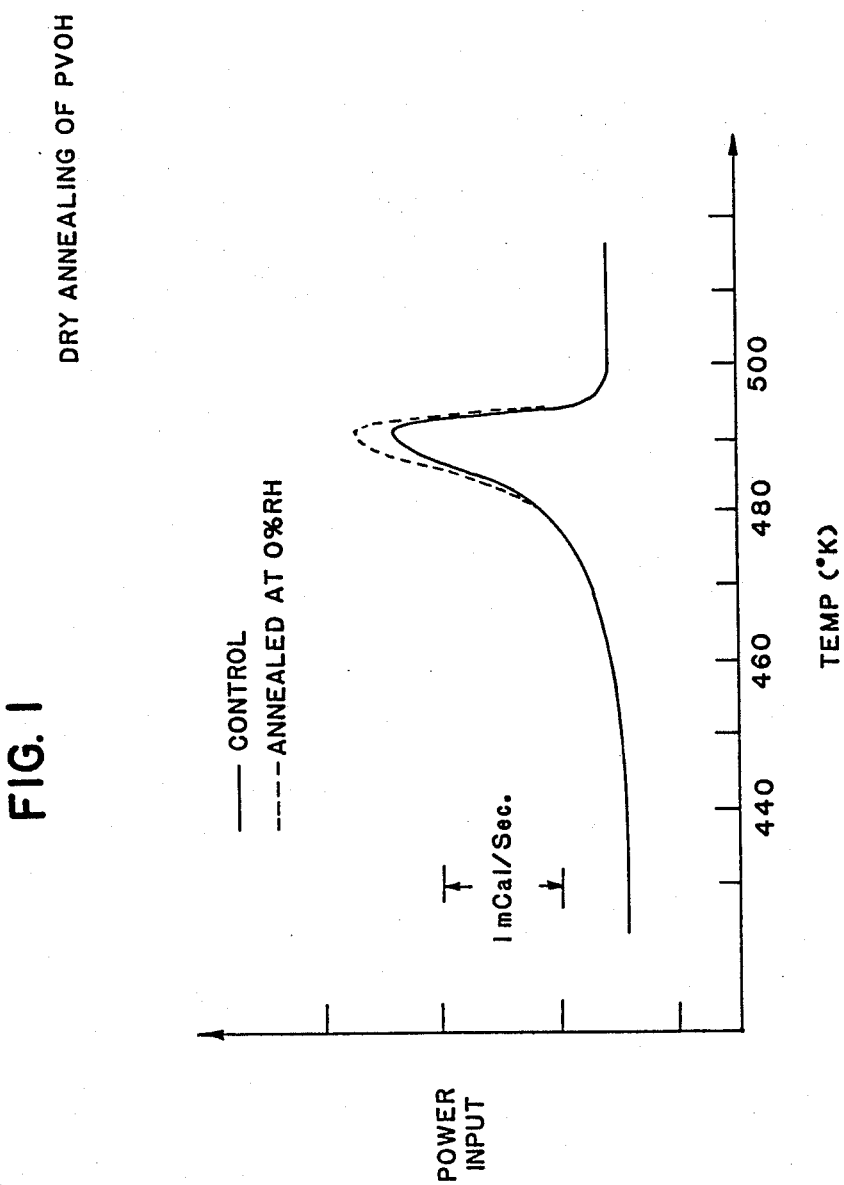
FIG. 1 shows two differential scanning calorimetric curves for a film of polyvinyl alcohol, illustrating the effect of dry annealing on the heat of fusion, and hence, crystallinity of the film.
Figure 2:
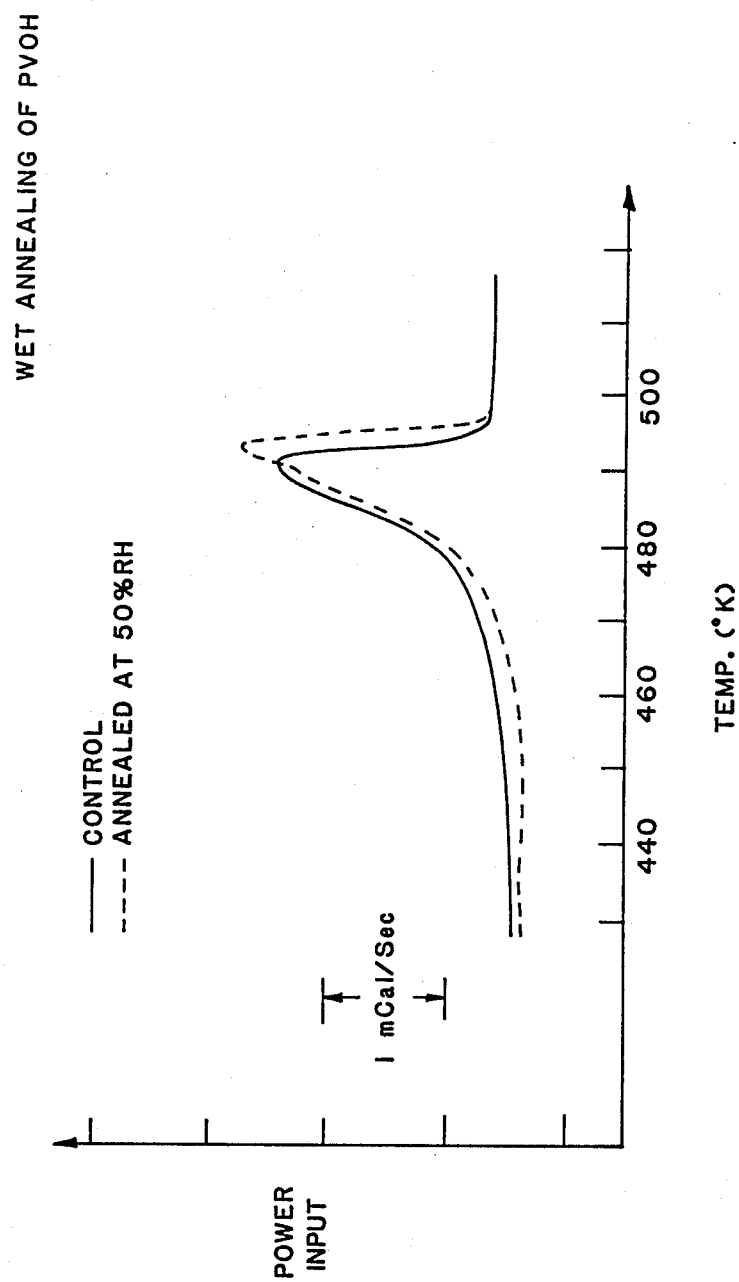
FIG. 2 is similar to FIG. 1, but illustrates the effect of wet annealing of the polyvinyl alcohol film.

It has been found that while dry annealing only changes the amorphous structure of the polymer to a crystalline structure, wet annealing, on the other hand, changes the crystalline structure and results in a higher primary crystalline melting peak. Consequently, further and significant improvement is realized in oxygen permeability of the polymer. Thus, referring to FIG. 1, it will be seen that dry annealing of a film of polyvinyl alcohol at 250° F. for two hours results in a modest increase in the heat of fusion as compared with the unannealed film, i.e., a change of from 11.1 m. cal. per gram to 11.6 m. cal. per gram. The shapes of the two curves are otherwise essentially the same and the peak melting points of the annealed and unannealed samples are both 492°K. By contrast, and with reference to FIG. 2, wet annealing of polyvinyl alcohol film at 250° F., for two hours and in a 50 percent relative humidity (R.H.) environment, not only alters the shapes of the annealed curves, but results in a higher main melting peak of 494° F., a difference which is regarded to be significant. Thus, wet annealing changes the crystalline structure of the poluyvinyl alcohol film resulting in a more perfect crystal structure and higher melting peak, which are associated with less oxygen permeability and hence improved oxygen barrier properties.

Figure 3:
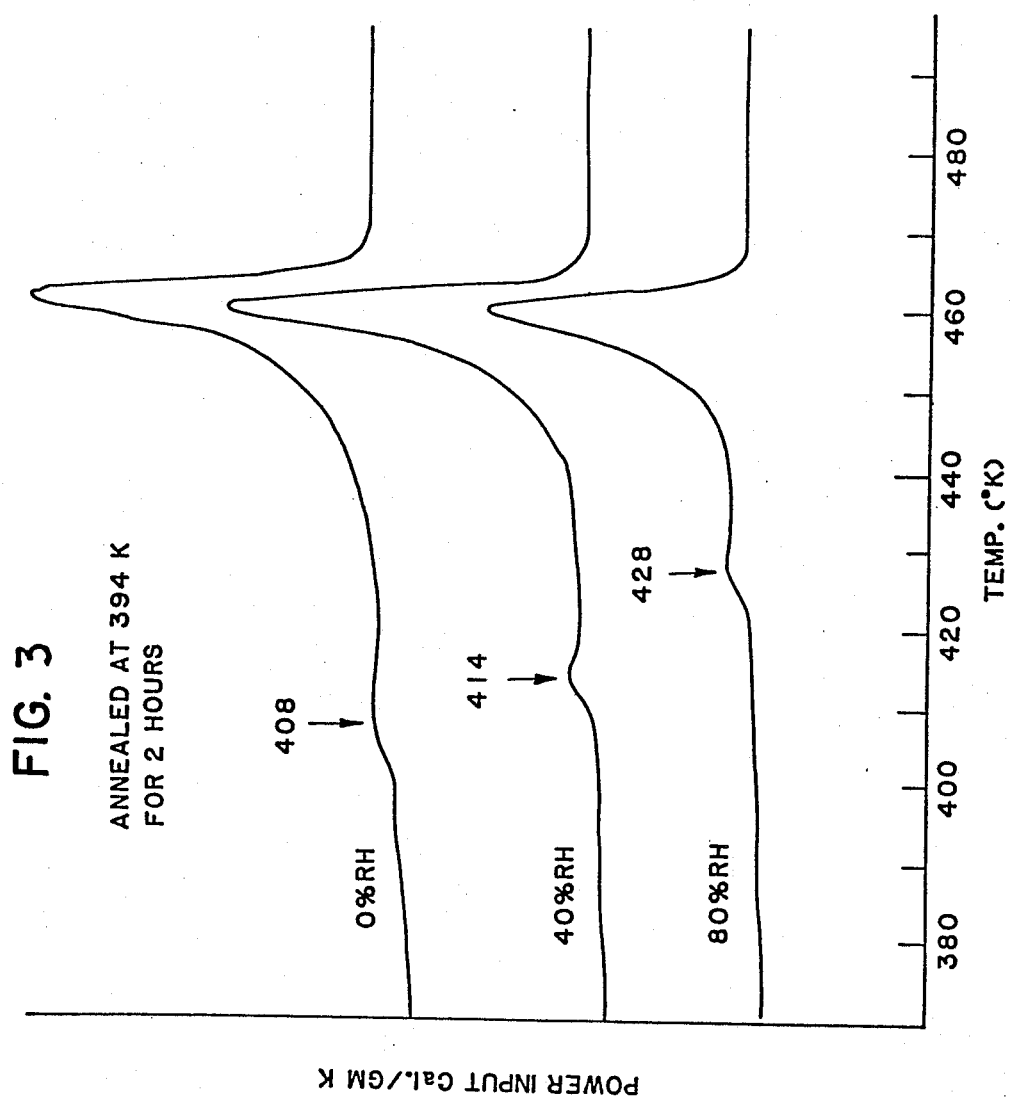
FIG. 3 shows the differential scanning calorimetric curves for a film of ethylene-vinyl alcohol copolymer, illustrating the advantages of wet annealing compared to dry annealing of the film.

Wet annealing of ethylene-vinyl alcohol copolymer film also results in improved oxygen barrier properties as compared with dry annealing as is evident from FIG. 3. As shown from the differential scanning curve of a dry annealed film of ethylene vinyl alcohol copolymer at 394° K. for 2 hours with films which have been annealed in the same conditions, but at 40% R.H. and 80% R.H., wet annealing results in higher secondary crystalline melting points when the film is not annealed, hence indicating improved crystallinity and oxygen barrier properties.

Figure 4:
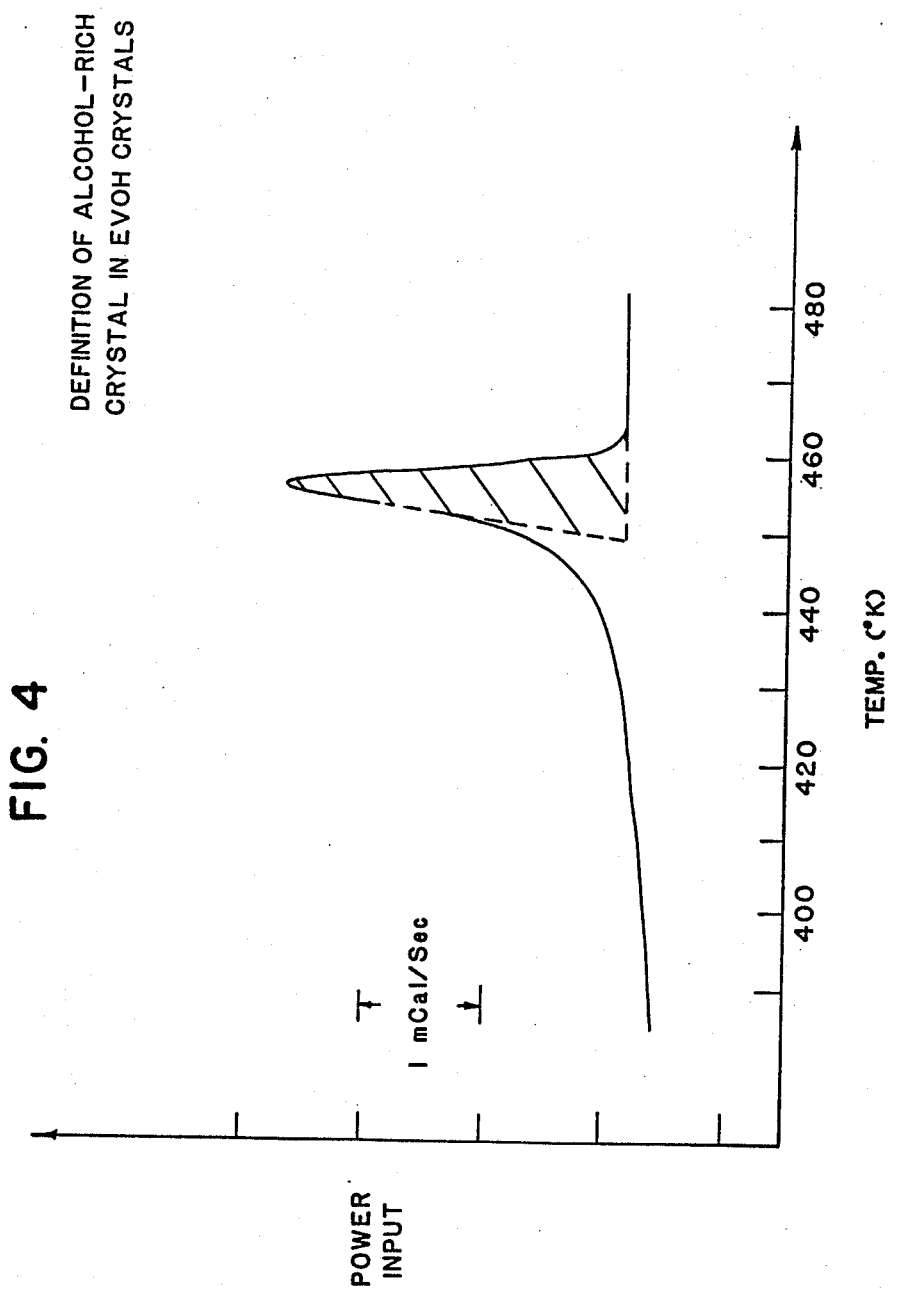
FIG. 4 is a differential scanning calorimetric curve of an ethylene-vinyl alcohol copolymer film illustrating a method of determining the vinyl alcohol-rich crystal content of the film.

In crystalline ethylene-vinyl alcohol copolymer, a portion of the copolymer has higher vinyl alcohol crystalline content than the overall average vinyl alcohol content of the copolymer and a portion which has lesser amount of crystalline vinyl alcohol. FIG. 4 illustrates the manner in which the crystalline amount of the vinyl alcohol-rich content of the copolymer is defined from the differential scanning calorimetric curve. From the shaded area in this figure, it is possible to calculate the heat of fusion which is, in turn, related to the degree of crystallinity.

It has been found that wet annealing increases the amount of the vinyl alcohol-rich crystalline portion of the copolymer and raises the main crystalline melting peak of the copolymers. Consequently, the wet annealing copolymer film or polymeric structure will have improved oxygen permeability.

The effect of the initial water content of ethylene-vinyl alcohol copolymer film on oxygen permeability is illustrated in Example 1, below.

EXAMPLE 1

Figure 5:
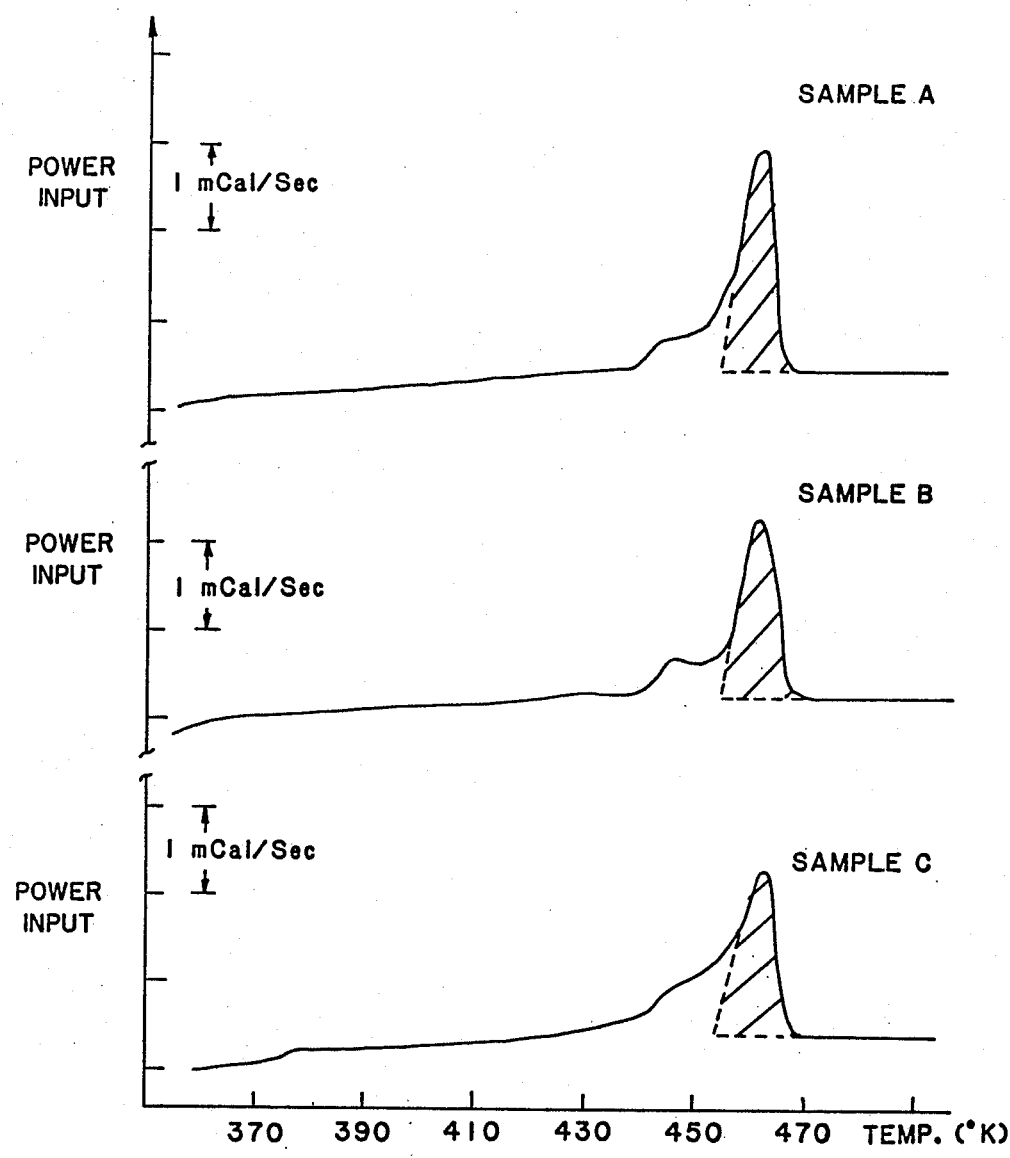
FIG. 5 illustrates the differential scanning calorimetric curves for ethylene-vinyl alcohol copolymer films of varying initial water content and comprising sodium chloride (desiccant)

Three ethylene-vinyl alcohol copolymer films of equal thickness, but having different initial water content, were retorted at 250° F. for 2 hours at 100% R.H. Each film included sodium chlorides as desiccant. Due to differences in the amount of water initially present in each film, the crystalline structure of each film was different as shown in FIG. 5. The results of these examples are shown in the following table.

TABLE I

| Film Samples | Initial Water Content, Wt % | Heat of Fusion of Alcohol-Rich Crystals, cal/g[1] | Oxygen Permeability[2] cc. mil/ 100 in.² day atm. |
| --- | --- | --- | --- |
| A | 0 | 12 | 0.048 |
| B | 7 | 11.4 | 0.075 |
| C | 11 | 9.8 | 0.12 |

[1]Represented by the respective shaded areas in the graphs of FIG. 5.
[2]Measured at 73° F. and 75% R.H.

EXAMPLE 2

Three other samples of ethylene-vinyl alcohol copolymer films, each having potassium nitrate as a desiccant, were retorted as in Example 1. The results are shown in Table II, below.

TABLE II

| Film Sample | Initial Water Content, Wt % | Heat of Fusion of Alcohol-Rich Crystals,[1] Cal./g | Oxygen Permeability,[2] cc. mil/ 100 in.$^2$ day atm. |
|---|---|---|---|
| D | 0 | 12.4 | 0.02 |
| E | 6.5 | 10.5 | 0.18 |
| F | 10.0 | 9.5 | 0.55 |

Figure 6:
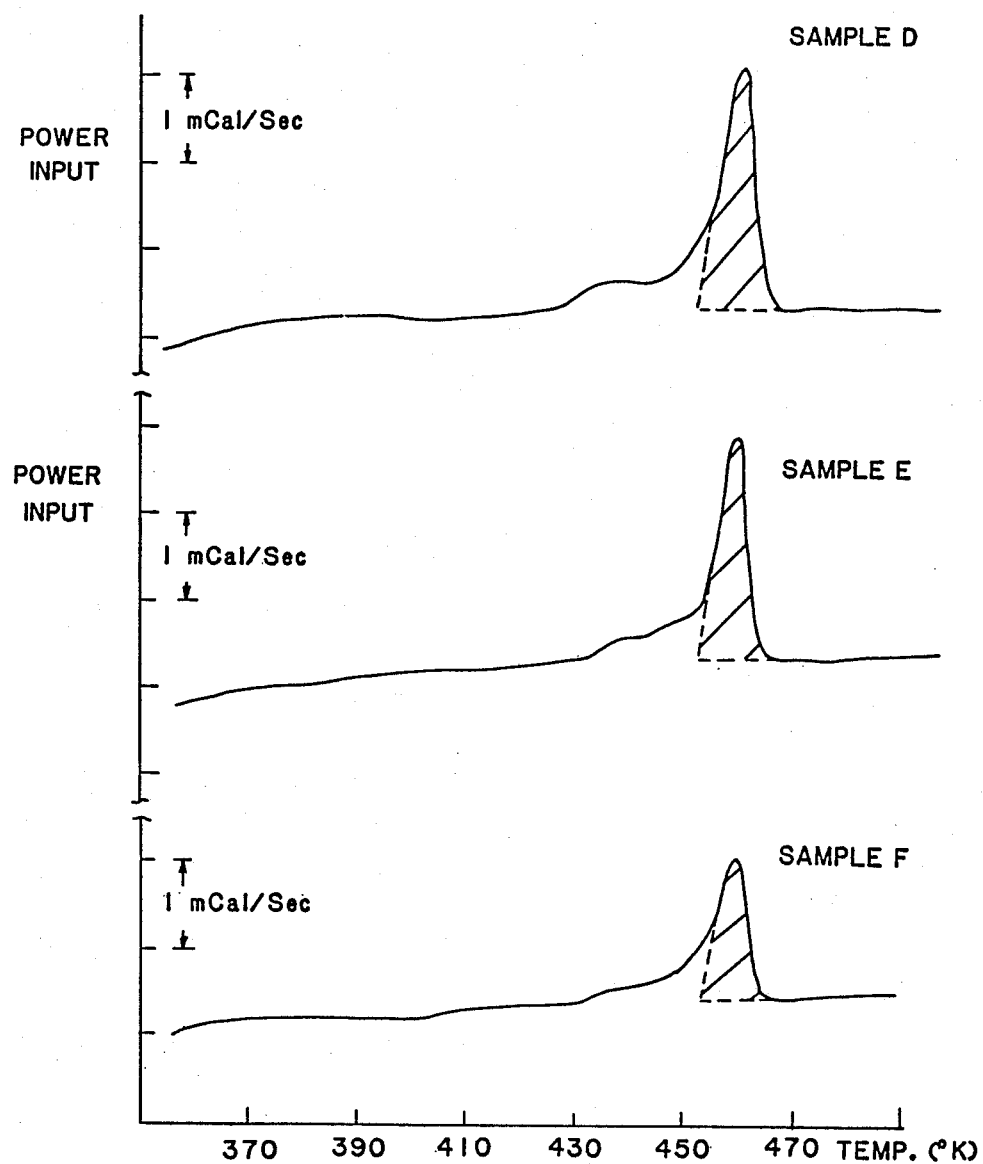
FIG. 6 is similar to FIG. 5, but for using potassium nitrate, as the desiccant and different initial water content in the film.

[1]Represented by the respective shaded areas in the graph of FIG. 6.
[2]Measurement at 93% R.H. and 73° F.

As shown in Tables I and II, the oxygen barrier property of ethylene-vinyl alcohol copolymer improves with increasing degree of crystallinity and larger crystal size of the vinyl alcohol-rich portion of the copolymer, resulting from wet annealing of the film.

As it was previously mentioned, a laminate structure comprising ethylene-vinyl alcohol copolymer or a polyvinyl alcohol polymer can also be wet annealed to improve the oxygen barrier property of the laminate. A typical laminate structure, for example, may consist of the following layers:

| Layer | Thickness, mil |
|---|---|
| High density, polyethylene | 15 |
| Adhesive | 2 |
| High density | 2 |
| Ethylene-vinyl alcohol copolymer | 2 |
| High density polyethylene | 2 |
| Adhesive | 2 |
| High density polyethylene | 15 |

More or less layers may be employed as desired or necessary and a desiccant may be included in the laminate, preferably in the adhesive layer.

In addition of ethylene-vinyl alcohol copolymer, other oxygen barrier materials may be used, which include polyvinyl alcohol and nylon.

Multi-layer polymeric structure comprising a layer of ethylene-vinyl alcohol copolymer are useful as packaging materials for making containers, pouches, bags, and the like. The relative thickness of the various layers will vary based on several considerations including resistance to oxygen permeability, structural integrity and economy. Thus, the ethylene-vinyl alcohol copolymer layer is typically interposed between two structural polyolefin layers such as by coextrusion of the different layers. Suitable polyolefins include polyethylene, polypropylene and a blend of the polyethylene with polypropylene. Other structural polymeric layers may be used instead of one or both of the polyolefin layers, depending on the intended use of the multi-layer laminate.

In order to improve inter-layer adhesion or to prevent interlaminar separation, the ethylene-vinyl alcohol copolymer layer may be adhesively bonded to the structural polymer layer. A variety of adhesives have been disclosed and are well known to those skilled in the art for use in multi-layer laminates. These adhesives include modified polyolefins such as those sold by Chemplex Corporation under the name Plexar, and maleic anhydride-modified polypropylene such as those sold under the name ADMER by Mitsui of Japan. Naturally, the choice of adhesive will depend on the particular structural polymer used in making the multi-layer laminate.

What is claimed is:

1. A method of increasing the oxygen resistance of an oxygen barrier film of a polymeric material, said polymeric material being selected from the group consisting of ethylene-vinyl alcohol copolymer, polyvinyl alcohol and nylon, which comprises heating said film at a temperature of from about 210° to about 250° F. in the presence of a moisture environment of at least about 20% relative humidity, said oxygen barrier film having a low initial water content when the heating step is commenced.

2. A method as in claim 1, wherein said film is heated at environment of at least 40 percent relative humidity.

3. A method of increasing the oxygen resistance of a polymeric structure comprising a film made of an oxygen barrier polymeric material, said polymeric material being selected from the group consisting of ethylene-vinyl alcohol copolymer, polyvinyl alcohol and nylon, which method comprises heating said structure at a temperature of from about 210° to about 250° F. in the presence of a moisture environment of at least about 20% relative humidity, said polymeric material having a low initial water content when the heating step is commenced.

4. A method as in claim 3 wherein said polymeric structure is heated in an environment of at least 40 percent relative humidity.

5. A method of increasing the oxygen resistance of a multi-layer polymeric structure having a moisture sensitive oxygen barrier layer, said barrier layer being made from a polymer selected from the group consisting of ethylene-vinyl alcohol copolymer, and polyvinyl alcohol and nylon, which method comprises heating said polymeric structure at a temperature of from about 210° to about 250° F. in the presence of a moisture environment of at least about 20% relative humidity, said oxygen barrier layer having a low initial water content when the heating step is commenced.

6. A method as in claim 5 wherein said multilayer polymeric structure is heated in an environment of at least 40 percent relative humidity.

7. A method as in claim 1 wherein said film is heated while maintaining a low water level of up to about 16% water in the polymeric material.

8. A method as in claim 3 wherein said film is heated while maintaining a low water level of up to about 16% water in the polymeric material.

9. A method as in claim 5 wherein said film is heated while maintaining a low water level of up to about 16% water in the oxygen barrier layer.

10. A method as in claim 1 wherein said film is heated while maintaining a low water level of up to about 13.5% water in the polymeric material.

11. A method as in claim 3 wherein said film is heated while maintaining a low water level of up to about 13.5% water in the polymeric material.

12. A method as in claim 5 wherein said film is heated while maintaining a low water level of up to about 13.5% in the oxygen barrier layer.

13. A method as in claim 1 wherein said film is heated while maintaining a low water level of up to about 10% water in the polymeric material.

14. A method as in claim 3 wherein said film is heated while maintaining a low water level of up to about 10% water in the polymeric material.

15. A method as in claim 5 wherein said film is heated while maintaining a low water level of up to about 10% water in the polymeric material.

16. A method as in claim 1 wherein said film is heated while maintaining a low water level of from about 6% to about 7% water in the polymeric material.

17. A method as in claim 3 wherein said film is heated while maintaining a low water level of from about 6% to about 7% water in the polymeric material.

18. A method as in claim 5 wherein said film is heated while maintaining a low water level of from about 6% to about 7% water in the oxygen barrier layer.

19. A method according to claim 1 wherein the polymeric material has an initial water content of about zero.

20. A method according to claim 5 wherein the polymeric material has an initial water content of about zero.

21. A method according to claim 5 wherein the oxygen barrier layer has an initial water content of about zero.

22. A method according to claim 1 wherein the polymeric material has an initial water content of below about 6.5 wt.%.

23. A method according to claim 3 wherein the polymeric material has an initial water content of below about 6.5 wt.%.

24. A method according to claim 5 wherein the oxygen barrier layer has an initial water content of below about 6.5 wt.%.

25. A method as in claims 7, 8, 9, 10, 11, 12, 13, 14, 15, 16, 17, 18, 19, 20, 21, 22, 23 or 24 wherein the maintaining of a low water level in the oxygen barrier layer is effected by employing a layer which has a desiccant incorporated therein.

* * * * *